3,562,263
2-SUBSTITUTED - 2 - OXAZOLINES AND 2-SUB-STITUTED - 5,6 - DIHYDRO-1,3,4-OXAZINES AND THEIR PREPARATION
Morton H. Litt and Alan J. Levy, Morristown, N.J., assignors to Allied Chemical Corporation, New York, N.Y., a corporation of New York
No Drawing. Filed July 13, 1964, Ser. No. 382,342
Int. Cl. C07d *87/06*
U.S. Cl. 260—244                                17 Claims

ABSTRACT OF THE DISCLOSURE

This invention relates to a novel process for the preparation of 2-substituted cyclic iminoethers. More particularly this invention relates to a novel process for the preparation of 2-substituted oxazolines and oxazines by the vapor phase cyclodehydration of N-(ω-hydroxyalkyl)-amides in the presence of a catalyst. These compounds are valuable intermediates for the preparation of useful polymers.

---

In the past attempts have been made to prepare 2-substituted oxazolines by heating N-(β-hydroxyethyl)-amides to effect cyclodehydration by thermal decomposition. This prior art procedure resulted in low yields of 2-lower alkyl substituted-2-oxazolines such as 2-methyl-2-oxazoline and 2-ethyl-2-oxazoline, but efforts to obtain 2-phenyl-2-oxazoline by this method were unsuccessful. In order to obtain 2-phenyl-2-oxazoline it was found necessary to add condensing agents such as phosphorus pentoxide to the system, and even then the yields obtained were low.

The cyclodehydration of N-(γ-hydroxypropyl)-amides to form the six member ring 5,6-dihydro-1,3,4-oxazines is well recognized as being more difficult than the cyclodehydration preparation of five member ring oxazolines and was not attempted in the past by thermal decomposition alone. However, catalytic procedures which were successfully used in the cyclodehydration of N-(β-hydroxyethyl)-amides were tried with N-(γ-hydroxypropyl)-amides with no success. It was thus necessary to employ complicated and expensive methods to prepare 2-substituted-5,6-dihydro-1,3,4-oxazines and the number of such compounds made was quite limited.

It is therefore an object of the present invention to provide an improved process for the preparation of 2-substituted cyclic iminoethers.

Another object of the present invention is to provide a process wherein high yields of 2-substituted iminoethers are obtained by the cyclodehydration of N-(ω-hydroxyalkyl)-amides.

A further object of the present invention is to provide a process for the cyclodehydration of N-(ω-hydroxyalkyl)-amides which may be used to produce both 2-substituted-2-oxazolines and 2-substituted-5,6-dihydro-1,3,4-oxazines.

A still further object of the present invention is to provide novel 2-substituted-5,6-dihydro-1,3,4-oxazines.

Additional objects and advantages of this invention will become apparent from the following detailed description.

In accordance with the present invention, N-(ω-hydroxyalkyl)-amides of the formula:

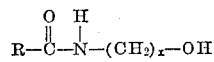

where R is a radical selected from the group consisting of alkyl which preferably contains 1–20 carbon atoms, aryl, alkylaryl and aralkyl and $x$ is an integer of 2–3 inclusive, are converted to 2-substituted cyclic iminoethers of the formula:

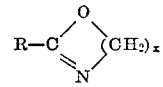

where R and $x$ have the meanings given above, by passing vapors of said N-(ω-hydroxyalkyl)-amides in contact with a heated catalyst selected from the group consisting of silica, alumina, silica-alumina compositions and silica-magnesia compositions. By this procedure 2-substituted-2-oxazolines and 2-substituted-5,6-dihydro-1,3,4-oxazines are obtained in yields as high as 100%. Additionally there may be prepared by this procedure novel 2-substituted-5,6-dihydro-1,3,4-oxazines wherein the 2-substituent is an alkyl radical preferably having 1–20 carbon atoms.

The N-(ω-hydroxyalkyl)-amides suitable for use in this invention may be obtained by the reaction of an ω-aminoalcohol with either an acid in accordance with the equation—

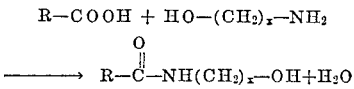

wherein R and $x$ have the meanings given above, or with an ester in accordance with the equation:

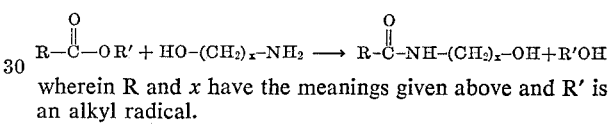

wherein R and $x$ have the meanings given above and R' is an alkyl radical.

The catalyst is preferably in the form of particles of sufficient size to enable a vapor stream to readily pass through a bed of the catalyst. Of the above indicated catalysts suitable for the process of the present invention, the best results were obtained using silica-alumina compositions with optimum results being obtained with silica-alumina clays.

The catalyst should be maintained at a temperature of at least about 150° C. and preferably at a minimum temperature of about 200° C. In general the conversion rate or percentage of reactants converted to 2-substituted cyclic iminoether for a given catalyst contact time, increases with increasing temperature. However, at temperatures above about 400° C. some decomposition products are formed thus decreasing the yields obtained. When very high catalyst temperatures are used, the amount of decomposition products formed can be minimized by decreasing the vapor-catalyst contact time either by decreasing the length of the path of the vapor stream through the catalyst bed or by increasing the velocity of the vapor stream.

In the preferred operation of the present process, N-(ω-hydroxyalkyl)-amide is vaporized by the application of heat. The vapors are passed through a heated bed containing one or more of the above-described catalysts, and the vapor stream after contact with the catalyst is cooled to form a liquid containing the desired 2-substituted cyclic iminoether. To facilitate the vaporization of the N-(ω-hydroxyalkyl)-amide the process may be carried out under reduced pressure. Additionally, to aid in the formation of a vapor stream, a gaseous stream may be bubbled into the liquid N-(ω-hydroxyalkyl)-amide. This gas is preferably an inert gas such as nitrogen in order to minimize discoloration of the final product.

As disclosed in copending U.S. application Ser. No. 382,343, of Morton H. Litt, Taghi G. Bassiri and Alan J. Levy, filed July 13, 1964, now U.S. Pat. 3,483,141, the 2-substituted-2-oxazolines and 2-substituted-5,6 - dihydro-1,3,4-oxazines prepared by the process of the present invention may be polymerized in the presence of initiators such as dimethyl sulfate and sulfuric acid. The resulting polymers may be used in films, fibers, paints and other well known polymer applications.

In addition, the compounds prepared by the process of this invention have many other utilities. For instance, they serve as solvents since they have some unusual compatibilities, and for the same reason they serve as plasticizers for many kinds of resins, and with variation in the kind and size of group attached to the carbon atom adjacent to the ring nitrogen, they can be widely adapted for any specific type of plastic and application of plastics.

The following examples are given to further illustrate the invention, but it is to be understood that the invention is not to be limited in any way by the details described therein. Pressures are in mm. of Hg.

EXAMPLE 1

Preparation of starting material

Into a 1-liter flask fitted with a Dean-Stark trap and a mechanical stirrer, was added a charge of 2 mols of benzoic acid, 2.2 mols of 3-aminopropanol, and 50 ml. of xylene. The reaction mixture was heated at reflux with stirring and the water formed by the resulting reaction was removed by azeotropic distillation. Heating was continued until the theoretical amount of water (36 grams) had been collected in the Dean-Stark trap. The reaction mixture was then fractionally distilled giving an 86% yield of N-($\gamma$-hydroxypropyl)-benzamide.

EXAMPLE 2

The apparatus used in this example included a 10" long by 1" diameter column filled with catalyst, one end of the column being attached to a flask by means of a Claison head and the other end of the column being attached to a receiving vessel by a connector having a sidearm. The column sloped downward at a slight angle from the Claison head to the receiving vessel. Independent heating means were provided to heat the flask and the column, and the receiving vessel was kept cool by means of a Dry Ice-acetone bath. The flask was provided with a gas inlet tube for introducing nitrogen into the liquid charge contained in the flask. The sidearm of the connector between the column and the receiving vessel was attached to a vacuum pump. The catalyst was a synthetic silica-alumina composition containing approximately 85% silica and 15% alumina (Houdry catalyst S–65).

52 grams of N-($\gamma$-hydroxypropyl) - benzamide were placed in the flask of the above described apparatus. The catalyst bed was heated to 235° C. and the pressure in the system was adjusted to about 2.5 mm. The N-($\gamma$-hydroxypropyl)-benzamide was distilled at a temperature of about 216–222° C. while bubbling nitrogen through the liquid charge and the resulting vapor stream was fed through the hot catalyst bed into the chilled receiving vessel, where it was condensed. The liquid collected in the receiver vessel was fractionally distilled giving a 56% yield of 2-phenyl-5,6-dihydro-1,3,4-oxazine.

EXAMPLE 3

N-($\gamma$-hydroxypropyl)-acetamide was produced by reacting glacial acetic acid with 3-aminopropanol in accordance with the procedure of Example 1. 68.8 grams of the N-($\gamma$-hydroxypropyl)-acetamide were placed in the flask of the apparatus of Example 2; the column again being filled with a synthetic silica-alumina catalyst containing about 85% silica and about 15% alumina.

The catalyst bed was heated to 265° C. and the pressure in the system was adjusted to about 3.8 mm. while a stream of nitrogen was blowing through the N-($\gamma$-hydroxypropyl)-acetamide. The N - ($\gamma$ - hydroxypropyl)-acetamide was distilled at a temperature of 180° C. and the resulting vapor stream was passed through the hot catalysts bed into the chilled receiver vessel where it was condensed. The liquid collected in the receiver vessel was then fractionally distilled giving a 99% yield of 2-methyl-5,6-dihydro-1,3,4-oxazine. The percent conversion of the starting material was 53%.

EXAMPLE 4

Into a 500 ml. flask fitted with a mechanical stirrer and a Dean-Stark trap was added a charge of 88.1 grams of methylpropionate and 90 grams of dried 3-amino-propanol. The reaction mixture was refluxed with stirring for 16 hours with the methyl alcohol formed being collected in the Dean-Stark trap. The reaction mixture was then fractionally distilled yielding 119.2 grams of N-($\gamma$-hydroxypropyl)-propionamide.

A 72 gram portion of the N-($\gamma$-hydroxypropyl)-propionamide was converted to 2-ethyl-5,6-dihydro-1,3,4-oxazine using the same apparatus as in Example 2, except the catalyst used was 64.3 grams of silica-magnesia composition pellets containing 30% magnesia and 70% silica. The system was maintained at a 2.2 mm. pressure with nitrogen being fed into the liquid charge in the flask. The catalyst bed was heated to 275° C. N-($\gamma$-hydroxypropyl)-propionamide was distilled at 165° C. and the vapors passed through the heated catalyst into the chilled receiver vessel where they were condensed. The liquid collected in the receiver vessel was fractionally distilled giving a 64% yield of 2-ethyl-5,6-dihydro-1,3,4-oxazine, with a conversion of 33%.

EXAMPLE 5

A 53.5 gram charge of N-($\gamma$-hydroxypropyl)-propionamide prepared by the method set forth in Example 4 was converted to 2-ethyl-5,6-dihydro-1,3,4-oxazine using the apparatus of Example 2, except that the catalyst in the column was 76.8 grams of silica-alumina clay (kaolin) pellets. The system was maintained at a pressure of 1.9 mm. with nitrogen being fed into the liquid charge in the flask, and the catalyst bed was heated to a temperature of 275° C. The N-($\gamma$-hydroxppropyl)-propionamide was distilled at 165° C. and the vapors passed through the heated catalyst into the chilled receiver vessel where they were condensed. The liquid collected in the receiver vessel was fractionally distilled giving a 100% yield of 2-ethyl-5,6-dihydro-1,3,4-oxazine with a 47% conversion.

EXAMPLE 6

The procedure of Example 5 was repeated except that the temperature of the kaolin catalyst bed was raised to 310° C. 2-ethyl-5,6-dihydro-1,3,4-oxazine was obtained in a 100% yield with a 61% conversion.

EXAMPLE 7

A 264.3 gram charge of N-($\gamma$-hydroxypropyl)-propionamide prepared by the method set forth in Example 4 was converted to 2-ethyl-5,6-dihydro-1,3,4-oxazine using the apparatus of Example 2, except that the catalyst in the column was 83.5 grams of kaolin clay pellets. The system was maintained at a pressure of 6.5 mm. with nitrogen being fed into the liquid charge in the flask, and the catalyst bed was heated to a temperature of 400° C. The N-($\gamma$-hydroxypropyl)-propionamide was distilled at 185° C. and the vapors passed through the heated catalyst into the chilled receiver vessel. The condensed liquid collected in the receiver was fractionally distilled giving a 35% yield of 2-ethyl-5,6-dihydro-1,3,4-oxazine with a conversion of 19%. The low yield and conversion were due to the large number of decomposition products found to be present in the liquid collected in the receiver vessel.

EXAMPLE 8

53.3 grams of N-($\gamma$-hydroxypropyl)-propionamide prepared by the method set forth in Example 4, were converted to 2-ethyl-5,6-dihydro-1,3,4-oxazine using the apparatus and general procedure of Example 2, except that the catalyst in the column was 81.6 grams of alumina which had been washed with sulfuric acid. The system was maintained at a pressure of 2.4 mm. with nitrogen being fed into the liquid charge in the flask, and the catalyst bed was heated to a temperature of 275° C. The N-(γ-hydroxypropyl)-propionamide was distilled at 165° C. and the vapors passed through the heated catalyst bed into the chilled receiver vessel. The condensed liquid collected in the receiver vessel was fractionally distilled giving an 88% yield of 2-ethyl-5,6-dihydro-1,3,4-oxazine with a 26% conversion.

EXAMPLE 9

83.2 grams of N-(γ-hydroxypropyl)-propionamide prepared by the method set forth in Example 4, were converted to 2-ethyl-5,6-dihydro-1,3,4-oxazine using the apparatus and general procedure of Example 2, except that the catalyst in the column was 69.7 grams of silica gel. The system was maintained at a pressure of 3.9 mm. with nitrogen being fed into the liquid charge in the flask, and the catalyst was heated to a temperature of 275° C. The N-(γ-hydroxypropyl)-propionamide was distilled at a temperature of about 170° C. and the vapors passed through the heated catalyst bed into the chilled receiver vessel. The condensed liquid collected in the receiver vessel was fractionally distilled giving 5.1 grams of 2-ethyl-5,6-dihydro-1,3,4-oxazine.

EXAMPLE 10

N-(γ-hydroxypropyl)-butyramide was prepared by reacting butyric acid with 3-aminopropanol in accordance with the general procedure of Example 1. 68.2 grams of the N-(γ-hydroxypropyl)-butyramide thus prepared were converted to 2-propyl-5,6-dihydro-1,3,4-oxazine using the apparatus and general procedure of Example 2, except that the catalyst used in the column was 86.1 grams of alumina. The system was maintained at a pressure of 1.9 mm. with nitrogen being fed through the liquid charge in the flask and the catalyst bed was heated to a temperature of 275° C. The N-(γ-hydroxypropyl)-butyramide was distilled at 177° C. and the vapors passed through the heated catalyst into the chilled receiver vessel. The condensed liquid collected in the receiver vessel was fractionally distilled giving an 82% yield of 2-n-propyl-5,6-dihydro-1,3,4-oxazine with a 26% conversion.

EXAMPLE 11

(Comparison run)

The procedure of Example 10 was repeated except that glass helices were substituted for the alumina catalyst. Upon fractional distillation of the liquid obtained in the receiver vessel, it was found that all but 0.2 gram of this product was unreacted N-(γ-hydroxypropyl)-butyramide, indicating that little or no reaction took place.

EXAMPLE 12

N-(γ-hydroxypropyl)-caproamide was prepared by reacting 2.0 mols of caproic acid with 2.2 mols of 3-aminopropanol in accordance with the procedure of Example 1. 57.0 grams of the N-(γ-hydroxypropyl)-caproamide thus prepared were converted to 2-n-pentyl-5,6-dihydro-1,3,4-oxazine employing the apparatus and general procedure of Example 2, with the same synthetic silica-alumina catalyst being used in the column. The system was maintained at a pressure of about 2.5 mm. with nitrogen being fed through the liquid charge in the flask, and the catalyst bed was heated to a temperature of 275° C. The N-(γ-hydroxypropyl)-caproamide was distilled at a temperature of about 165–170° C. and the vapors passed through the heated catalyst bed into the chilled receiver vessel. The condensed liquid collected in the receiver vessel was fractionally distilled giving a 99% yield of 2-n-pentyl-5,6-dihydro-1,3,4-oxazine, with a 62% conversion.

EXAMPLE 13

N-(β-hydroxyethyl)-isobutyramide was prepared by reacting 2.0 mols of isobutyric acid with 2.2 mols of 2-aminoethanol in accordance with the procedure of Example 1. 108.5 grams of the N-(β-hydroxyethyl)-isobutyramide was converted to 2-isopropyl-2-oxazoline using the apparatus and general procedure of Example 2, except that the catalyst employed in the column was 88.2 grams of kaolin pellets. The system was maintained at a pressure of about 2.5 mm. with nitrogen being fed through the liquid charge in the flask. The catalyst bed was heated to a temperature of 290° C. The N-(β-hydroxyethyl)-isobutyramide was distilled at a temperature of about 170° C. and the vapors passed through the heated catalyst bed into the chilled receiver vessel. The condensed liquid collected in the receiver vessel was fractionally distilled giving a 99% yield of 2-isopropyl-2-oxazoline with a 52% conversion.

EXAMPLE 14

N-(β-hydroxyethyl)-heptanoamide was prepared by reacting 2.0 mols of n-heptonoic acid with 2.2 mols of 2-aminoethanol in accordance with the procedure of Example 1. 176.5 grams of the N-(β-hydroxyethyl)-heptanoamide wash converted to 2-n-hexyl-2-oxazoline using the apparatus and general procedure of Example 2, except that the catalyst employed in the column was an 80.1 gram charge of kaolin pellets. The system was maintained at a pressure of about 1.9 mm. with nitrogen being fed through the liquid charge in the flask and the catalyst bed was heated to a temperature of 310° C. The N-(β-hydroxy-ethyl)-heptanoamide was distilled at a temperature of about 197° C. and the vapors passed through the heated catalyst bed into the chilled receiver vessel. The condensed liquid collected in the receiver vessel was fractionally distilled giving a 97% yield of 2-n-hexyl-2-oxazoline with a 47% conversion.

EXAMPLE 15

N-(β-hydroxyethyl)-isovaleramide was prepared by refluxing a mixture of 7.1 mols of isovaleric acid, 8.3 mols of 2-aminoethanol and 100 cc. xylene in a three-neck, two-liter flask, fitted with a stirrer, thermometer, condenser and a Dean-Stark trap, following the general procedure of Example 1. The N-(β-hydroxyethyl)-isovaleramide was converted to 2-isobutyl-2-oxazoline, in a scaled-up version of the apparatus of Example 2, which included a three foot column packed with 235 grams of the same synthetic silica-alumina composition used as a catalyst in Example 2. The N-(β-hydroxyethyl)-isovaleramide was distilled through the catalyst bed, which was maintained at a temperature of 275° C. and 279 grams of 2-isobutyl-2-oxazoline were collected in the receiver vessel.

EXAMPLE 16

N-(β-hydroxyethyl)-acetamide was prepared by reacting 10 mols of acetic acid with 11 mols of 2-aminoethanol following the general procedure of Example 1. A 501.9 gram charge of the N-(β-hydroxyethyl)-acetamide was converted to 2-methyl-2-oxazoline using the same apparatus as in Example 2, except that the catalyst in the column was 86 grams of kaolin clay pellets. The system was maintained at a pressure of 2.9 mm. with nitrogen being bubbled through the liquid charge of N-(β-hydroxyethyl)-acetamide in the flask. The catalyst bed was heated to 275°–290° C. The N - (β - hydroxyethyl) acetamide was heated to reflux and the resulting vapors passed through the heated catalyst into the chilled receiver vessel where they were condensed.

The liquid collected in the receiver vessel was fractionally distilled to separate water and unreacted N-(β-hydroxyethyl)-acetamide from the 2-methyl-2-oxazoline produced. This product was further dried with CaO and again fractionally distilled, giving 333.4 grams of 2-methyl-2-oxazoline.

EXAMPLE 17

N-(β-hydroxyethyl)-benzamide is prepared by reacting 2.0 mols of benzoic acid with 2.2 mols of 2-aminoethanol in accordance with the procedure of Example 1. 150 grams of the N-(β-hydroxyethyl)-benzamide are converted to 2-phenyl-2-oxazoline in the apparatus used in Example 14 employing the same catalyst, pressure and catalyst bed temperature.

EXAMPLE 18

N-(β-hydroxyethyl)-n-lauramide was prepared by reacting lauric acid with 2-aminoethanol. 149.9 grams of the N-(β-hydroxyethyl-n-lauramide were cyclodehydrated using the apparatus of Example 2 with the column filled with pellets of kaolin clay. A nitrogen atmosphere was maintained in the system and the pressure was regulated at about 3 mm. The temperature of the catalyst bed was kept at about 300° C. The N-(β-hydroxyethyl)-n-lauramide was distilled at 270° C. and the vapors passed through the heated catalyst into the chilled receiver vessel where they were condensed. The liquid collected in the receiver vessel was fractionally distilled yielding 80 grams of 2-n-undecyl-2-oxazoline boiling at 114°/0.5 mm. and melting at 27.8–28.4° C.

EXAMPLE 19

The aparatus used in this example was the same as that used in Example 2, except that a pressure-equalizing feed apapratus was connected to the flask and the catalyst in the column was 93.5 grams of kaolin clay pellets.

The catalyst bed was heated to 310° C., and the pressure in the system was adjusted to 0.1 mm. with a nitrogen atmosphere. 54.2 grams of N-(β-hydroxyethyl)-p-chlorobenzamide were placed in the feed apparatus, which was then heated to melt the amide. The liquefied amide was aded to the flask dropwise while maintaining the flask at 320° C. The resulting vapors were passed through the hot catalyst bed into the chilled receiver vessel where they condensed. The dropwise addition of the liquefied amide to the flask took 3 hours, after which the catalyst was maintained at 310° C. for another hour. A total of 43 grams of product were collected in the receiver vessel. After purification by recrystallization from ethyl ether, there were obtained 36 grams of 2-p-chlorophenyl-2-oxazoline, having a melting point of about 83° C.

It will be aparent that many modifications and variations may be effected without departing from the scope of the novel concepts of the present invention, and the illustrative details disclosed are not to be construed as imposing undue limitations on the invention.

We claim:

1. A process for the preparation of 2-substituted cyclic iminoethers which comprises passing vapors of an N-(ω-hydroxyalkyl)-amide of the formula:

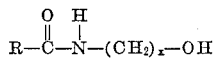

where R is a member selected from the group consisting of alkyl, aryl, alkylaryl and aralkyl radicals and $x$ is an integer of from 2 to 3, in contact with at least one catalyst selected from the group consisting of silica, alumina, silica-alumina composition and silica-magnesia compositions, said catalyst being at a temperature of at least about 150° C., whereby said N-(ω-hydroxyalkyl)-amide undergoes cyclodehydration to form a 2-substituted cyclic iminoether of the formula:

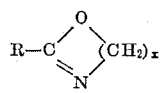

wherein R and $x$ have the above meanings.

2. A process according to claim 1 wherein the temperature of said catalyst is from about 200 to 400° C.

3. A process according to claim 1 wherein R is an alkyl radical of from 1 to 20 carbon atoms.

4. A process according to claim 1 wherein said catalyst is a silica-alumina clay.

5. A process according to claim 1 wherein the said N-(ω-hydroxyalkyl)-amide is N-(γ-hydroxypropyl) - benzamide and the said 2-substituted cyclic iminoether prepared therefrom is 2-phenyl-5,6-dihydro-1,3,4-oxazine.

6. A process according to claim 1 wherein the said N-(ω - hydroxyalkyl) - amide is N-(γ-hydroxypropyl)-acetamide and the said 2-substituted cyclic iminoether prepared therefrom is 2-methyl-5,6-dihydro-1,3,4-oxazine.

7. A process according to claim 1 wherein the said N-(ω-hydroxyalkyl)-amide is N-(γ-hydroxypropyl)-propionamide and the said 2-substituted cyclic iminoether prepared therefrom is 2-ethyl-5,6-dihydro-1,3,4-oxazine.

8. A process according to claim 1 wherein the said N-(ω-hydroxyalkyl) - amide is N-(γ-hydroxypropyl)-butyramide and the said 2-substituted cyclic iminoether prepared therefrom is 2-n-propyl-N-5,6-dihydro-1,3,4-oxazine.

9. A process according to claim 1 wherein the said N-(ω-hydroxyalkyl)-amide is N-(γ-hydroxypropyl)-caproamide and the said 2-substituted cyclic iminoether prepared therefrom is 2-n-pentyl-5,6-dihydro-1,3,4-oxazine.

10. A process according to claim 1 wherein the N-(ω-hydroxyalkyl)-amide is N-(β-hydroxyethyl)-isobutyramide and the said 2-substituted cyclic iminoether prepared therefrom is 2-isopropyl-2-oxazoline.

11. A process according to claim 1 wherein the N-(ω-hydroxyalkyl)-amide is N-(β-hydroxyethyl)-heptanoamide and the said 2-substituted cyclic iminoether prepared therefrom is 2-n-hexyl-2-oxazoline.

12. A process according to claim 1 wherein the N-(ω-hydroxyalkyl)-amide is N-(β-hydroxyethyl)-isovaleramide and the said 2-substituted cyclic iminoether prepared therefrom is 2-isobutyl-2-oxazoline.

13. A process according to claim 1 wherein the N-(ω-hydroxyalyl)-amide is N-(β-hydroxyethyl)-acetamide and the said 2-substituted cyclic iminoether prepared therefrom is 2-methyl-2-oxazoline.

14. A process according to claim 1 wherein the N-(ω-hydroxyalkyl)-amide is N-(β-hydroxyethyl)-benzamide and the said 2-substituted cyclic iminoether prepared therefrom is 2-phenyl-2-oxazoline.

15. A process according to claim 1 wherein the N-(ω-hydroaxyalkyl)-amide is N-(β-hydroxyethyl)-p-chlorobenzamide and the said 2-substituted cyclic iminoether prepared therefrom is 2-p-chlorophenyl-2-oxazoline.

16. 2-propyl-5,6-dihydro-1,3,4-oxazine.

17. 2-propyl-5,6-dihydro-1,3,4-oxazine.

References Cited

UNITED STATES PATENTS 2,329,619    9/1943    Jayne et al. _____ 260—244

FOREIGN PATENTS 81,868    6/1956    Netherlands _____ 260—244

OTHER REFERENCES

Wiley et al., "Chem. Reviews" vol. 44, pp. 452–454 (1949).

U.S. Cl. X.R.

252—364; 260—2, 30.2, 307

HENRY R. JILES, Primary Examiner

R. T. BOND, Assistant Examiner

PO-1050
(5/69)

UNITED STATES PATENT OFFICE
CERTIFICATE OF CORRECTION

Patent No. 3,562,263          Dated February 9, 1971

Inventor(s) Morton H. Litt and Alan J. Levy

It is certified that error appears in the above-identified patent and that said Letters Patent are hereby corrected as shown below:

Column 3, line 73, "catalysts" should be --catalyst--.

Column 4, line 36, "hydroxppropyl" should be
            --hydroxypropyl--.

Column 6, line 26, "hydroxy-ethyl" should be
            --hydroxyethyl--.

Column 7, line 24, "apapratus" should be --apparatus--.

Claim 17, column 8, line 1, "2-propyl-5,6-dihydro-1,3,4
                    oxazine"

should be       --2-pentyl-5,6-dihydro-1,3,4
                    oxazine--.

Signed and sealed this 26th day of October 1971.

(SEAL)
Attest:

EDWARD M. FLETCHER, JR.            ROBERT GOTTSCHALK
Attesting Officer                   Acting Commissioner of Pat